United States Patent
Burtscher

(10) Patent No.: US 11,005,677 B2
(45) Date of Patent: May 11, 2021

(54) SYSTEM AND METHOD FOR CONTROLLING BUILDING SYSTEMS ENGINEERING

(71) Applicant: TRIDONIC GMBH & CO KG, Dornbirn (AT)

(72) Inventor: Florian Burtscher, Dornbirn (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 16/344,920

(22) PCT Filed: Nov. 6, 2017

(86) PCT No.: PCT/EP2017/078323
§ 371 (c)(1),
(2) Date: Apr. 25, 2019

(87) PCT Pub. No.: WO2018/091296
PCT Pub. Date: May 24, 2018

(65) Prior Publication Data
US 2019/0273628 A1 Sep. 5, 2019

(30) Foreign Application Priority Data

Nov. 15, 2016 (DE) .................. 10 2016 222 370.4

(51) Int. Cl.
*H04L 12/28* (2006.01)
*G05B 19/042* (2006.01)
*H04L 12/12* (2006.01)

(52) U.S. Cl.
CPC ........ *H04L 12/2827* (2013.01); *G05B 19/042* (2013.01); *H04L 12/12* (2013.01);
(Continued)

(58) Field of Classification Search
CPC ........ G05B 19/042; G05B 2219/25011; H04L 12/12; H04L 12/282; H04L 12/2827;
(Continued)

(56) References Cited

U.S. PATENT DOCUMENTS

| 2011/0141909 A1* | 6/2011 | Hibara | ............... G01S 5/021 370/241 |
| 2012/0031984 A1* | 2/2012 | Feldmeier | .............. F24F 11/30 236/49.3 |

(Continued)

FOREIGN PATENT DOCUMENTS

| DE | 202012009494 | 10/2012 |
| EP | 2639780 | 9/2013 |
| WO | 2015054611 | 4/2015 |

OTHER PUBLICATIONS

Austria Search Report in co-pending Austria Patent Application 3 GM 304/2016-1 dated Nov. 26, 2019.
(Continued)

*Primary Examiner* — Chad G Erdman
(74) *Attorney, Agent, or Firm* — Andrus Intellectual Property Law

(57) ABSTRACT

The invention relates to a system for controlling building systems engineering on the basis of measured values detected by sensors. The system comprises a mobile device (3), at least one stationary sensor unit (14.1, 14.2, 14.3) and a data processing unit (16). The mobile device (3), the at least one sensor unit (14.1, 14.2, 14.3) and the data processing unit (16) are connected by at least one communications network. The system is distinguished in that the mobile device (3) has at least one sensor (5) for detecting a physical variable, and the data processing unit (16) generates a control signal for the building engineering system on the basis of a combination of information about the physically (Continued)

detected variable of the sensor of the mobile device (3) and of the stationary sensor unit (14.1, 14.2, 14.3).

14 Claims, 2 Drawing Sheets

(52) U.S. Cl.
CPC ........ *H04L 12/282* (2013.01); *H04L 12/2834* (2013.01); *G05B 2219/25011* (2013.01); *H04L 2012/285* (2013.01); *H04L 2012/2841* (2013.01); *Y02D 30/50* (2020.08)

(58) Field of Classification Search
CPC ......... H04L 12/2834; H04L 2012/2841; H04L 2012/285; Y02D 50/40
See application file for complete search history.

(56) References Cited

U.S. PATENT DOCUMENTS

| | | | |
|---|---|---|---|
| 2012/0299485 A1 | 11/2012 | Mohan et al. | |
| 2014/0207280 A1* | 7/2014 | Duffley | G05D 1/0016 |
| | | | 700/257 |
| 2014/0207282 A1* | 7/2014 | Angle | H04L 12/2809 |
| | | | 700/257 |
| 2016/0088438 A1* | 3/2016 | O'Keeffe | H04W 4/21 |
| | | | 455/456.2 |
| 2016/0370773 A1* | 12/2016 | Mousavi | H04L 67/12 |
| 2017/0003258 A1* | 1/2017 | Krauss | G01N 21/274 |
| 2018/0332691 A1* | 11/2018 | Rajagopalan | H05B 47/19 |

OTHER PUBLICATIONS

German search report dated Aug. 24, 2017 in priority German patent application 10 2016 222 370.1.

International Search Report dated Dec. 19, 2017 in parent PCT application PCT/EP2017/078323.

* cited by examiner

SYSTEM AND METHOD FOR CONTROLLING BUILDING SYSTEMS ENGINEERING

CROSS REFERENCE TO RELATED APPLICATIONS

The present application is the U.S. national stage application of international application PCT/EP2017/078323 filed Nov. 6, 2017, which international application was published on May 24, 2018 as international publication WO 2018/091296 A1. The International Application claims priority to German patent application 10 2016 222 370.4 filed Nov. 15, 2016.

FIELD OF THE INVENTION

The invention relates to a system and a method for controlling and/or regulating building systems engineering on the basis of measured valued detected by sensors. In particular, a system for controlling and/or regulating building systems engineering by means of a mobile device and an improved local resolution of a generated control signal is featured.

BACKGROUND OF THE INVENTION

It is known to control building engineering systems, for example, illumination systems by means of sensors arranged distributed in a building, for example presence sensors. Presence sensors detect and report in a sensor signal to a control unit the presence of one or more persons in its respective detection range. The utility model specification DE 20 2012 009 494 U1 exhibits such a building engineering system with a central control unit and a plurality of sensors arranged in distributed manner, comprising for example tactile sensors, switches and presence sensors. In the process, the spatial resolution of the detection of a person depends on the size and the number of distinguishable detection ranges as well as the spatial arrangement of the individual sensors. Corresponding to the possible resolution of a position information for a person, control signals can be generated for the control of the building systems engineering, for example of lights.

It is disadvantageous that the quality of the detection of a person in the detection range depends solely on the type of sensors used and that a local resolution of a determined position information depends on the number of presence sensors used. For example, a non-moving person will no longer be detected after the expiration of a pre-set period of time by a presence sensor, which essentially functions on the basis of a motion detector.

Therefore, the invention addresses the question of achieving an improved control and regulation of a building engineering system.

The problem is solved with a system having the features described below, as well as a method with the corresponding features.

SUMMARY OF THE INVENTION

A system according to the invention for controlling and/or regulating building systems engineering on the basis of measured values detected by sensors comprises a mobile device, at least one stationary sensor unit and a data processing unit. The mobile device, the at least one sensor unit and the data processing unit are connected by at least one communications network. The system according to the invention is distinguished in that the mobile device has at least one sensor for detecting a measured value of a physical variable, and the data processing unit is equipped to generate a control signal for the building engineering system on the basis of a combination of information about the detected measured value (or several measured values) of the sensor of the mobile device and the at least one stationary sensor unit.

The mobile device is preferably a smart phone, but can also be a mobile computer, for example a laptop or a tablet. A sensor or sensor unit can detect a single physical variable quantitatively and/or qualitatively, or detect several physical variables and process them in accordance with an instruction in order to output information about the physically detected variable.

By means of the combination of information about the physically detected variable of the sensor of the mobile device with information about detected measured value(s) of the stationary sensor unit according to the invention the generation of a significantly more accurate control signal taking a situation into consideration is possible, without the expenditure for the installation of several stationary sensor units and/or sensor units with improved quality at unfortunately higher costs per sensor unit becoming necessary. Nowadays a plurality of sensors are installed in mobile devices like smart phones, which can provide (if necessary pre-processed) sensor data as information about measured values. This information can for example be raw data of the measured values or also pre-processed data. These measured sensor data are available on the one hand directly as measured values, or in pre-processed form, possibly also in combination with one another, for example by an inertial measurement unit (subsequently also referred to as IMU). The control signal generated on the basis of a combination of information about the physically detected variables of the sensor of the mobile device and the stationary sensor unit can facilitate both an improved regulation of the building engineering system and also open up the possibility to calibrate the evaluation of the measurement of the physical variable of the mobile device. With this for example a temperature, an air pressure or also a starting point of a sequence of position values of the IMU as well as a drift of the sequence of position values can be determined through the combination of the physically detected variables of the sensor with the stationary sensor unit.

According to one embodiment of the system for controlling and/or regulating building systems engineering the at least one stationary sensor unit is equipped to detect the presence of a person in at least one detection range by means of a measurement of a physical variable, that is, to function as a presence sensor, and to transmit it in a sensor signal to the data processing unit.

The connection of at least one stationary presence detector, which is connected to the data processing unit by a communications network, with which information transmitted from the mobile device by a measured physical variable of the mobile device facilitates the linking of location-specific detected information of the mobile device with the corresponding location-specific information determined by the at least one sensor unit. The data processing unit can improve the limited local resolution of the presence sensor by means of combination with the physically detected variable of the sensor of the mobile device. With this, a more precise control of a building engineering system, for example of lighting in a building, is possible. Hence potential savings in building maintenance as well as an improved control in accordance with the requirements of users of the building are realized. The combination of information from the stationary sensor unit and the mobile device can also consist in the use of data only from the mobile device or the stationary sensor unit, if the respective other information is not available.

The system for controlling and/or regulating building systems engineering can be designed such that the mobile device is equipped to transfer the information about measured values (physically detected variables) of the sensor and/or preprocessed measured values as information about the physically detected variable in a data signal to the data processing unit, wherein the data processing unit is part of the building systems engineering.

With this a centrally arranged data processing unit can use the information of even a plurality of mobile devices for generating the control signals, which thus builds upon an even denser sensor network and which facilitates a correspondingly more accurate regulation and control. In addition, a central data storage for storing the information for an analysis to be performed offline of the generated data for the building engineering system is possible, in order to optimize the building engineering system and its operating parameters by means of known data analysis tools.

The system for controlling and/or regulating building systems engineering can also be designed such that the data processing unit and/or the mobile device is equipped to execute a calibration of the sensor of the mobile device by means of information about the physically detected variable both of the sensor of the mobile device and the stationary sensor unit. Calibration of the sensor also means a correction of the information derived from the primary detected data of the sensor or an adaptation of parameters in the processing algorithm of the detected measured values.

In the case of an IMU, as for example used in smart phones, the accuracy of the determined position can become lower over the course of time, since one error in the position determination increases with the increasing integration of the measured values. The procedure according to the method makes it possible by means of detection range limits of stationary presence detectors to detect corresponding deviations in the positions e.g. determined on the part of the mobile device and to calibrate the corresponding evaluation of the IMU. To this end, the entrances in the detection range of the motion detector are compared with the position information at this time point. Such a calibration is of course also possible with other sensors, for example temperature sensors. Hence not only does the control of the building systems engineering occur more accurately, but also other applications, which access the position information or temperature information etc. determined by the IMU, benefit from the more accurate information made possible.

The system for controlling and/or regulating building systems engineering according to one exemplary embodiment can have a plurality of stationary sensor units arranged in distributed manner.

In particular, a plurality of stationary sensor units arranged over a region of influence of a building engineering system, for example temperature sensors, presence detectors, possibly also belonging to different subsystems, for example air conditioning or lighting, facilitate in the evaluation on the basis of a combination with sensors of the mobile devices, the increase of the improvement of the generated control signal on the basis of the combination of the information of the stationary sensor units and of the mobile sensor vis-à-vis the respective possible information solely on the basis of the stationary sensor units or solely on the mobile unit.

In the system for controlling and/or regulating building systems engineering the mobile device can be equipped with at least one sensor, e.g. a motion sensor, in particular comprising acceleration sensors, gyroscope sensors, gravity sensors, rotation sensors.

According to one design, the at least one sensor of the mobile device is designed as a position sensor, in particular as a satellite navigational system receiver, as a compass sensor, as a proximity sensor, as an orientation sensor. According to one design of the system according to the invention, the at least one sensor of the mobile device is designed as an environment sensor, in particular as a pressure sensor, as a brightness sensor, as a humidity sensor or as a temperature sensor. The sensor can also be designed as a camera sensor, and/or as a radio sensor.

The plurality of different sensors of the mobile device in conjunction with the stationary sensor units facilitates improved regulations for building systems engineering systems. For example, a mobile device with a brightness sensor in a space with a stationary temperature sensor can perform a significantly more situation appropriate control of air conditioning systems, heating systems, shading systems in windows than would be possible solely from the stationary temperature sensor. Thus insolation and lighting and heating requirements of a user can be more precisely detected and correspondingly taken into consideration.

According to one development of the invention the system for controlling and regulating building systems engineering can have at least one device which defines a reference position for a position determination of the mobile device.

Such a reference position can for example be provided on a door (or better every door of the building), at a building entrance by means of a device mounted there, which enables a radio communication or light-supported communication (visible light communication, abbreviated to VLC) between the door device and the mobile device. Such a device can for example comprise an RFID chip or a radio beacon in accordance with a standard such as Bluetooth™. Therewith, for one thing a spatially defined starting point is provided for an IMU of the mobile device and a time synchronization between the mobile device and the data processing unit of the system according to the invention. At the same time, an application can be initialized and started at this reference position by means of communication between a building-side reference unit and the mobile device, which realized the transmission of the information of the physically detected variable of the sensor from the mobile device to the data processing unit.

One advantageous design of the system for controlling and/or regulating building systems engineering is distinguished in that the at least one stationary sensor unit comprises one of the following sensors: motion detector, brightness sensor, microphone, camera sensor and temperature sensor, or a combination of the foregoing described sensors.

Preferably the data processing unit can also be set up to generate a position information for the position of the mobile device on the basis of the combination of information about the physically detected variable of the sensor of the mobile device and of the stationary sensor unit.

The generation of an accurate position information on the position of the mobile device through the combined evaluation of the information about the physically detected variable of the sensor of the mobile device and of the stationary unit enables a more accurate position determination in a building than the evaluation of only presence sensors with a characteristic detection range of 3 to 9 m alone. Thus, an accurate position determination of the mobile device within a building becomes possible, since in particular the conventional position determination for mobile devices by means of satellite supported position determination systems (GPS, GLONASS, COMPASS, GALILEO, . . . ) does not function within closed buildings.

In particular, it is advantageous if the system for controlling and/or regulating building systems engineering shows the data processing unit equipped to control units of the building infrastructure, in particular lights, ventilation systems, heating systems, air conditioning systems, alarm systems, fire alarm systems with the control signal.

The control or regulation of building systems engineering can occur particularly efficiently if information about the current use of a space is available at the right time with determined values for physical variables such as temperature, brightness, humidity. The combination of measured values determined by stationary sensor units with the determined measured values on the part of mobile devices enables a significantly more accurate control of the building systems engineering. For example, the evaluation including the number of persons in a room determined by means of microphones of the mobile device can adjust the ventilation of the room as a precaution, before a stationary temperature sensor triggers a corresponding control signal. Since mobile phones are, as a rule, carried by their user, the information gives provides insight about the respective measured value at a person's location in the building.

The technical problem is also solved by a method for controlling and/or regulating building systems engineering on the basis of measured values determined by sensors in a system comprising a mobile device, at least one stationary sensor unit and a data processing unit. In the process, the mobile device, the at least one stationary sensor unit and the data processing unit are connected by at least one communications network. The method is distinguished in that in a step of the detection the mobile device detects a physical variable with at least one sensor, and in a step of the signal generation, the data processing unit generates a control signal for the building engineering system on the basis of a combination of information about the physically detected variable of the sensor and the stationary sensor unit.

Further objectives, advantages, features and application possibilities of the invention arise from the following description of an exemplary embodiment on the basis of the attached figures. In the process, all the described features are in their own right or in any combination the subject matter of the invention defined in the attached claims. The figures show the following

DETAILED DESCRIPTION

In the figures, identical references show identical or similar features. In the interest of a brief and clear presentation, repetitive explanations of the same references will be dispensed with.

Figure 1:
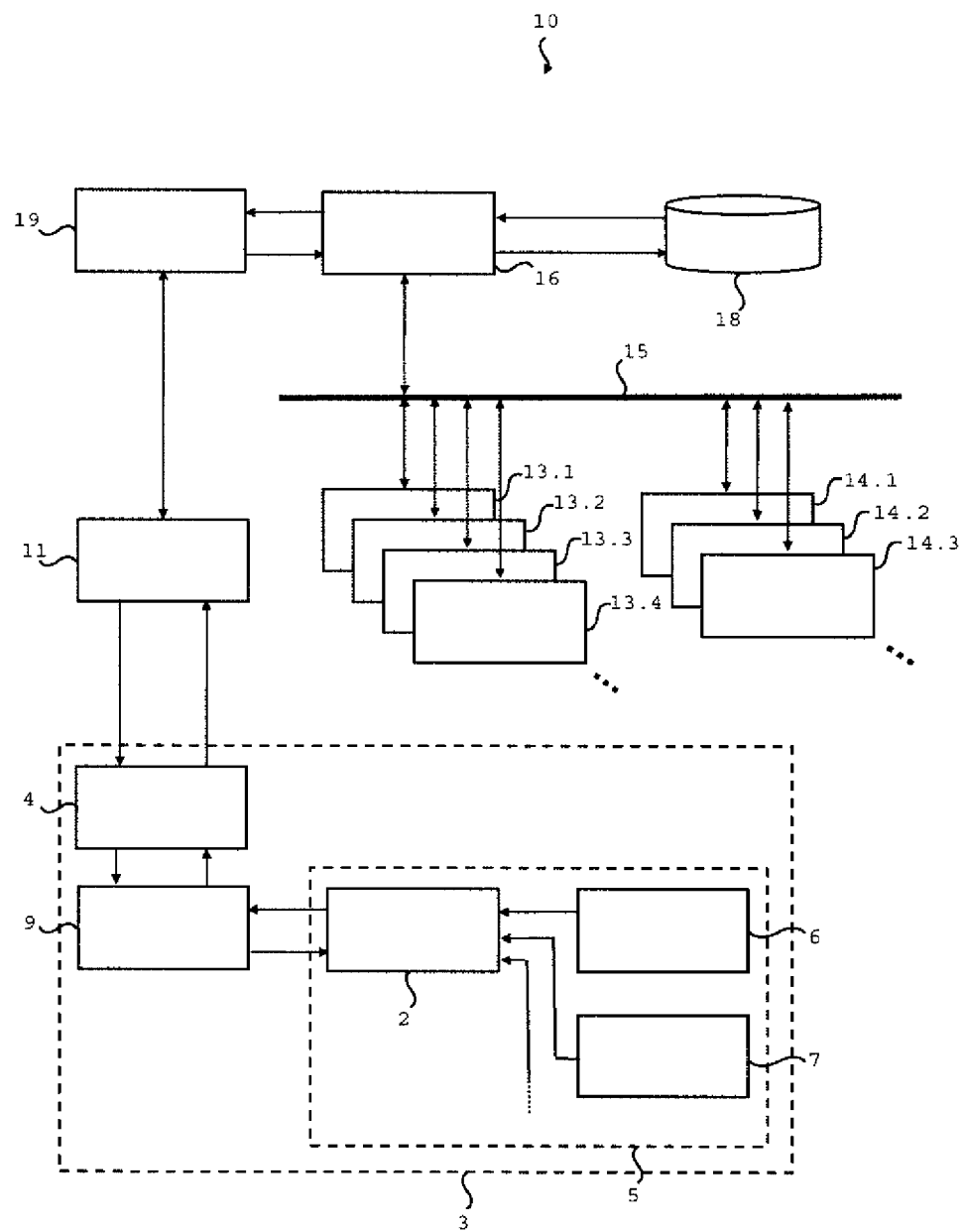
FIG. 1 shows an embodiment of the system according to the invention for controlling and/or regulating building systems engineering on the basis of values determined by the sensors.

FIG. 1 shows an embodiment of the system for determining a position information with a mobile device 3 as a block diagram. The presented mobile device comprises a sensor 5, which comprises several individual sensors 6, 7 and a sensor signal processing unit 8.

A sensor 5, also referred to as a detector or sensing element, is a technical component that can qualitatively and quantitatively detect physical properties as measured variables, e.g. heat quantity, temperature, dampness, pressure, sound field parameters, brightness, acceleration of its environment. These variables are detected by means of physical effects and transformed into a processable electrical signal. Hence, the sensing element is the first element of a measurement chain. In addition to the actual individual sensors 6, 7 the sensor 5 can sometimes comprise further elements of a measurement chain, which generate a data signal from the electrical sensor signal, or from several electrical sensor signals, said data signal containing information about the physically detected variable of the sensor 5.

Sensors 5 in mobile devices 3 can be consolidated in three subgroups:

Motion sensors, which measure acceleration forces and rotational forces with respect to three spatial directions x, y, z, Environmental sensors measure different variables which are brought into connection with the environment, for example temperature or air pressure Positional sensors, in order to determine a position of the mobile device 3, which can mean a processing of the data of the motion sensors.

Sensors 5 within the scope of the invention can be realized either by hardware as directly measuring sensors, or by software. The hardware-based sensors are physically installed in the mobile device 3 and can directly measure different variables, such as e.g. acceleration values of the mobile device and the humidity of the environment. The software-based sensors 5 also access information from the hardware-based sensors 5 and can therefore be regarded as virtual sensors 5. Virtual sensors use either one or several hardware-based sensors 5 and combine their detected variables with the aid of algorithms, which can have adaptable parameters, so that a new (virtual) measured variable emerges as a result of the algorithm.

Subsequently some typical sensors 5 will be briefly presented, which can be available in the mobile device 3, in particular when this is designed as a smart phone or tablet.

An acceleration sensor measures the acceleration forces that act on the device. Frequently micro-electro-mechanical systems (abbreviated as MEMS) are used with smart phones. The advantages of MEMS sensors are small dimensions, affordability and robustness.

A gyrosensor measures the rotation speed around an axis in the room. This can occur for all three spatial axes. The rate of rotation sensor, also referred to as a gyroscope, makes use of the Coriolis effect.

A magnetic field sensor measures the geological magnetic field of the earth. The magnetic field sensor uses the Hall effect. Three magnetic field sensors, arranged at right angles to one another, are used in a mobile device to determine a magnetic field in the room.

A barometric sensor (barometer) determines the air pressure in the atmosphere. With the measured data of the barometer, the air pressure of the sea level and the current weather information it is possible to determine at which height the sensor 5 is located. Such a sensor can furnish information, in particular in buildings, about the position with respect to the floors. Various factors such as initial height, gravity at the actual location and the temperature-dependent density of the air are to be considered in the process.

A light sensor measures a light intensity in the environment.

An RGB sensor is essentially a photodiode with a color filter that is able to absorb the intensity of illumination and the color temperature of light sources.

A proximity sensor is used to determine whether an object is before a screen of a mobile device 3. The proximity sensor uses infrared rays to measure the distance the object is from the screen.

Smart phones frequently have two cameras as optical sensors, one on the front and one on the back.

Microphones can be used as acoustic sensors 5, for example in MEMS technology.

A sensor 5 for the ambient temperature can be present in the mobile device 3 together with or as an alternative to a sensor for humidity.

Within the scope of a preprocessing, the physically detected variables of several elementary sensors 6, 7 can be linked with one another or evaluated jointly, in order to generate further information about physically detected variables. The goal of linking the data of several sensors 5, 6, 7 is to increase the quality of the information or to generate new information based on the recorded physical variables of the elementary sensors 6, 7.

For example, a linear acceleration sensor can be implemented by means of software with a combination of an acceleration sensor and a gyrosensor. This virtual sensor returns the acceleration of the mobile device 3 adjusted for the effects of the gravitation.

Like the linear acceleration sensor, a gravitation sensor can likewise be implemented by the acceleration sensor and the gyrosensor. The gravitation sensor returns the direction and intensity of the gravitation in relation to the coordinate system of the mobile device.

A position determination sensor can determine a position in three-dimensional space by means of satellite navigation methods or by means of IMU. External interference such as clouds, buildings or other obstacles hampers satellite navigation methods. Position determination methods resorting to WLAN or VLC are likewise known. The calculation of the position is CPU-intensive and has a negative impact on the energy management of the mobile device 3.

FIG. 1 shows a control unit 9 of the mobile device 3, for example a processor, which receives one or more data signals of the sensor 5 and transmits them via a transmit/receive device 4 of the mobile device 3 to a stationary transmit/receive device 11 of the building infrastructure system 10. The transmission can occur via a communications standard for radio systems, in particular but not exclusively WLAN, Bluetooth or also GSM, UMTS, LTE, CDMA and their expansions, or via light-supported communication such as VLC. In particular, smart phones and mobile computers as mobile devices 3 often have several transmit/receive devices 11 in accordance with the mentioned standards.

The building engineering system 10 is represented in FIG. 1 as an illumination system 10, whose components communicate with one another by a bus connection 12, for example in accordance with the DALI™ standard. Other standards for building systems engineering are likewise possible within the framework of the invention. The building engineering system will as a rule comprise further units such as heating and air conditioning subsystems etc. The shown illumination (sub) system 10 further comprises a plurality of lamps distributed in the range to be illuminated 13.1, 13.2, ..., 13.4 and presence sensors 14.1, ..., 14.3, which can likewise communicate by the bus connection 12 with a data processing unit 16 of the illumination system 10. The presence sensors 14.1, ..., 14.3 are stationary sensor units, which for example detect movements in a respective detection range and transmit them to the data processing unit 16. The data processing unit 16 generates control signals for controlling the lamps 13.1, 13.2, ..., 13.4 on the basis of the stationary sensor units 14.1, ..., 14.3 in combination with information about physically detected variables of the sensor 5 of the mobile device 3. The data processing unit 16 can also comprise a central processing unit which communicates with the illumination system 10 and/or other subsystems via a suitable interface.

In the process, it is not critical for the invention whether the generation of the control signals is executed by the data processing unit 16 of the illumination system 10 presented in FIG. 1. The generation of control signals could even occur in the mobile device 3, without deviating from the generation of the control signals according to the invention on the basis of a combination of information about a physical variable detected by means of the sensor 5 and the measurement of a physical parameter by the stationary sensor units 14.1, ..., 14.3. In this case, however the building-side generated information would have to be transmitted to the mobile device 3.

The data processing unit 16 in FIG. 1 is connected to a data storage unit 18, in which the control signals generated according to the invention or information about measured values can be stored temporally and/or spatially resolved. Thus a time displaced evaluation is possible, in particular also with initial variables comprising the information about physically detected variables of the sensor 5 and the sensor units 14.1, ..., 14.3. An analysis of the control and regulation behavior and/or a user behavior with the objective of a subsequent optimization of parameters of the building infrastructure system is hence possible, for example in order to reduce the operating costs of the system or to improve the conditions for the users.

An inertial measuring unit or IMU of the mobile device 3 is a combination of several inertial sensors, for example acceleration sensors and rate of rotation sensors. In particular, acceleration values from an IMU and position change values are in each case determined relative to a gravitation line.

Due to spatial restrictions in simple designs, inertial measurement units are frequently components of mobile communication devices such as smart phones and mobile computers, for example tablets. Thus IMUs are preferred embodiments for the sensor 5 within the scope of the present invention.

For detecting measured values in respect to the six possible kinematic degrees of freedom, an IMU has three orthogonally arranged acceleration sensors (translation sensors) for detecting the translatory movement in x- or y- or z-axis and three rate of rotation sensors (gyroscopic sensors) arranged orthogonally to one another for the detection of rotating (circling) movements in x- or y- or z-axis. An IMU returns as measured values three linear acceleration values for the translatory movement and three angular velocities for the rates of rotation. In an inertial navigation system (abbreviated to INS) the position in the room is determined in relation to a reference point from the measured values of the IMU for the linear accelerations, after compensation of the gravitational acceleration, through the linear velocity and through further integration of the velocity. The integration of the three angular velocities returns, in relation to a reference point, an orientation in the room.

Additional magnetic field sensors and satellite navigation sensors, actual satellite navigation receivers can be integrated in IMUs for determining the integration constants, to improve the accuracy and to correct the drift of the aforementioned sensors.

As soon as the smart phone detects the initial position of the user through GPS, WiFi, mobile data, or has a reference transducer mounted at a known point the measured values can be determined by the IMU sensors in order to estimate a traveled way or path of the user and thus send its relative position to the reference point.

Figure 2:
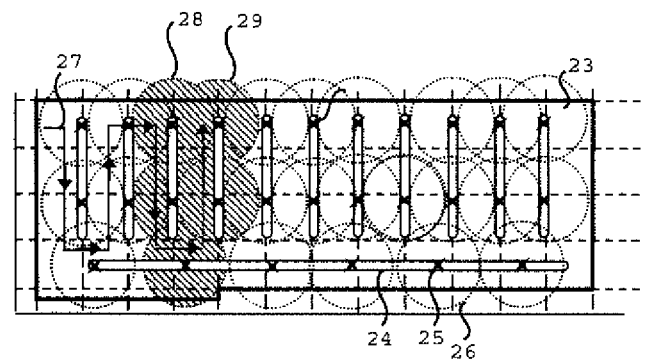
FIG. 2 shows a usage scenario of an embodiment of the system according to the invention for determining a position information.
Figure 2:
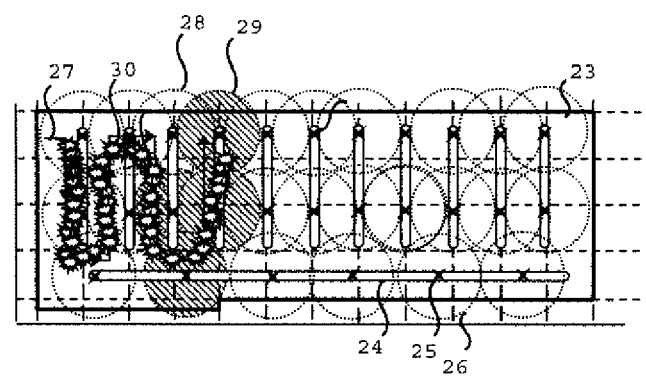
Figure 2:
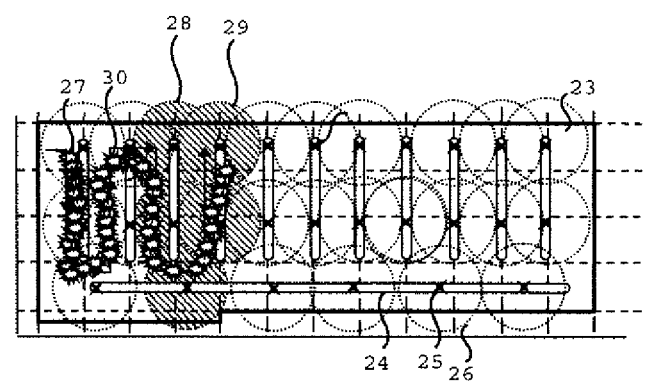

In FIG. 2 a usage scenario of the system according to the invention for determining a position information in a room is explained.

The upper section of FIG. 2 shows a room 23 in a floor plan. Lighting is provided in the room by ceiling-mounted lamps 24, which can be switched on and off jointly or individually by presence sensors 25 (PIR sensors) and can be dimmed if necessary. The presence sensors 25 each have a known detection range 26, within which the presence sensor 25 arranged centrally in the circular detection region 26 detects the presence of a person.

This basic structure of the room 23 is in each case identical in the upper, middle and lower sections of FIG. 2.

In the upper section of FIG. 2 a person who is carrying the mobile device 3 is moving on the path 27 through the room 23. A determination of the position information of the person is possible in the upper section of FIG. 2 with a first accuracy, which corresponds to the resolution of the individual detection ranges 26 of the presence sensor 25. By increasing the number of presence sensors 25 and a joint evaluation in the data processing unit 16 it was possible to increase the first accuracy. The installation-side expenditure over the entire room 23 would however rise and would be correspondingly high over an entire building.

While it is possible to detect the movements of the person with the illumination system presented in FIG. 2, the detected data are however too low in accuracy for a person-specific distribution of brightness within closed rooms. The detection range 26, in which movements are detected, is relatively large with a diameter of usually 4 to 9 m and normally comprises the range of several dimmable lamps. If the person moves only within the detection range 26 of one presence sensor 25 no movement path can be created for the person and the brightness cannot be correspondingly adjusted. If several persons move in the room 23, allocation to individual persons is not possible or would lead to incorrect results.

In the upper section of FIG. 2 the detection ranges 26, which the person last crossed through on the path 27, are shown shaded.

A person is also moving in the middle section of FIG. 2, now with the mobile device 3 on the path 27 through the room 23. However, sensor data of the mobile device 3 were evaluated here to detect the path.

The evaluation of the data of the mobile device 3 generates a path trail 30 from a sequence of position information generated by means of sensor data. For example, measured data of an acceleration sensor and of an orientation sensor are processed together. The orientation sensor can be realized by means of software through merging measured data of a magnetic field sensor, an acceleration sensor and a gyrosensor. The steps of the test person are extracted from the measured data of the acceleration sensor. An amount from all three axes of the acceleration sensor is formed, because potential errors per layer of the mobile device 3 in the space are to be compensated.

In particular the measurement of the magnetic field can however be distorted by interference, for example monitors, pipes in the room 23.

A directional information is determined from the measured values of the orientation sensor.

With the determined data of the movement sensor and the orientation sensor a path trail 30 is specified in the mobile device 3 or in the data processing unit 16, which follows the actual path 27 of the person in the room 23 comparatively accurately. At the end of the path trail 30 a significant deviation of the path trail 30 from the actual path 27 can be detected. Such a deviation is typical for the comparatively simply structured, compact IMUs without mechanically expensive cardan suspension and its control, with which only low requirements in accuracy and long term stability can be met. A drift of the position information solely due to data of the IMU would, in the case presented in the middle section of FIG. 2, result in the severe deviation of the path trail 30 determined solely by means of the data of the mobile device 3 from the actual path 27 not being detected in the detection region 26, although the path trail 30 enables a much more accurate tracking of the path 27 of the person with the mobile device 3. This is shown in the middle section of FIG. 2 by the fact that the detection range 28 not touched by the detected path trail 30 is not shown shaded, while all other detection ranges 29 which are touched by the path trail 30 detected on the basis of the information of the mobile device 3 are shown shaded. A control signal on the basis of the path trail 30 alone would therefore not control the illumination of the room 23 situation appropriate.

With the aid of the lower section of FIG. 3 the advantages of the procedure according to the invention for determining a position information for the mobile device 3 are made clear.

The person moves on the path 27 through the room 23 with a mobile device 3. According to the invention the data processing unit 16 generates a control signal for the illumination system 10 on the basis of a combination of information about the physically detected variables of the IMU as a sensor of the mobile device 3 and the stationary presence sensors 25. In this way the severe deviation of the detected path 30 from the path 27 of the person through the room 23 is taken into consideration by means of the joint evaluation within the scope of the generation of the control signal for the illumination 24, since the detected values of the stationary presence sensor 25 are smoothly adopted in the generation of the control signal. The combination of the information about the physical variables detected by the sensor 5, presented here by way of example with the aid of the IMU, with the values of the presence sensors 25 makes it possible to determine an improved position information with a second position accuracy. The second position accuracy is in the process greater than the first position accuracy, which describes an accuracy of a position information determined for the mobile device 3 solely on the basis of the presence sensors 25.

In the lower section of FIG. 3 the result of the joint evaluation is taken into consideration in that the detection range 28 of the presence sensor is shown shaded, since this presence sensor 25 detects the person on the path 27.

Along with the determination of the position on a plane it is also possible, evaluated complementarily or individually, to determine a floor. To this end data of an air pressure sensor can be evaluated alone or in combination with the IMU. In particular in open staircases running over several stories such an evaluation is helpful.

What is claimed is:

1. A control system for a building lighting system having a plurality of lamps, the control system comprising:
   a data processing unit (16) wherein control signals from the data processing unit control the operation and dimming of the plurality of lamps in building lighting system;
   a plurality of stationary sensor units (14.1, 14.2, 14.3) arranged in a distributed manner within a building or a part of the building, wherein each stationary sensor unit is equipped with a motion sensor to detect the motion of a person within a detection range of the motion sensor and to transmit a signal to the data processing unit indicating when a person is detected as moving within the detection range;
   a smart phone including an inertial measurement unit to detect positional information of the person carrying the smart phone, said inertial measurement unit detecting a spatially defined, known starting position and calculating positional information of the smart phone relative to the known starting position, wherein the smart phone transmits the positional information from the inertial measurement unit or pre-processed information from the inertial measurement unit to the data processing unit;
   wherein the data processing unit and the plurality of stationary sensors are connected by at least one communications network comprising a bus connection, and the smart phone communicates wirelessly with the data processing system;
   and further wherein
   the data processing unit (16) is equipped to generate control signals for the building lighting system on the basis of a combination of the positional information transmitted from the smart phone and signals from the plurality of distributed stationary sensor units (14.1, 14.2, 14.3) indicating when a person is detected as moving within the detection range for the respective motion sensor.

2. The control system according to claim 1, wherein the data processing unit (16) and/or the mobile device (3) is equipped to execute a calibration of positional information provided by the inertial measurement unit of the smart phone on the basis of the detection range limits of the motion sensors of the stationary sensor units (14.1, 14.2, 14.3), wherein the calibration is accomplished by comparing entrances of the detection range to the respective motion sensor to the positional information determined by the inertial measurement unit on the smart phone at a point in time.

3. The control system according to claim 1, wherein the plurality of stationary sensor units (14.1, 14.2, 14.3) each have motion sensors that are arranged in distributed manner so that the detection of the movement of a person in the respective detection range occurs in a spatially resolved manner.

4. The control system according to claim 1, wherein in addition to the inertial measurement unit, the smart phone further comprises:
   at least one environment sensor comprising one or more of a pressure sensor, a brightness sensor, a humidity sensor or a temperature sensor
   a microphone,
   a camera sensor,
   and a radio sensor.

5. The control system according to claim 1, wherein the system has at least one mounted device which defines a reference position for the inertial measurement unit to calculate the positional information of the smart phone, wherein the reference point provides the spatially defined known, starting point for the inertial measurement unit and the mounted device communicates with the smart phone wirelessly.

6. The control system according to claim 1, wherein the at least one stationary sensor unit (14.1, 14.2, 14.3) further comprises at least a brightness sensor, microphone, camera sensor or temperature sensor.

7. The control system according to claim 1, wherein the data processing unit (16) is also equipped to control one or more additional units of the building infrastructure (13.1, 13.2, 13.3), comprising at least one of: a ventilation system, a heating system, an air conditioning system, an alarm system, a fire alarm system.

8. The control system according to claim 1 wherein the bus connection is a DALI bus connection; and the data processing unit, the plurality of lamps and the plurality of stationary sensor units communicating over the at least one communications network communicate in accordance with the DALI standard.

9. The control system according to claim 1 wherein the positional information from the inertial measurement unit is used to determine whether the smart phone remains within the detection range of the respective stationary motion sensor.

10. A method for controlling a building illumination system, the method comprising:
    providing at least one smart phone comprising an inertial measurement unit, wherein each smart phone is carried by a person within the building;
    providing a plurality of stationary sensor units (14.1, 14.2, 14.3), each comprising a motion sensor;
    providing an illumination system with a plurality of lamps and a data processing unit wherein control signals from the data processing unit control the operation and dimming of the lamps in illumination system, and wherein the data processing unit (16) communicates wirelessly with the at least one smart phone and communicates with the plurality of stationary sensors and the lamps over a bus connection;
    detecting the position of the at least one smart phone with the inertial measurement unit on the smart phone and transmitting positional information representing the detected position of the at least one smart phone wirelessly to the data processing unit, wherein the inertial measurement unit detects a spatially defined, known starting position and calculates positional information of the smart phone relative to the known starting position;
    detecting whether one or more persons are moving within the detection range of each stationary motion sensor and transmitting a signal from each stationary motion sensor to the data processing unit indicating when one or more persons are detected to be moving within the detection range of the respective stationary motion sensor;
    generating control signals in the data processing unit to control the operation and dimming of the lamps in the illumination system on the basis of the combination of positional information from the inertial measurement system of the at least one smart phone carried by the person in the building and the signals transmitted from motion sensors of the plurality of stationary sensor units (14.1, 14.2, 14.3).

11. The method according to claim 10 wherein the bus connection is a DALI bus connection; and the data processing unit, the plurality of lamps and the plurality of stationary sensor units communicating over the bus connection in accordance with the DALI standard.

12. The method according to claim 10 wherein the positional information from the inertial measurement unit is used to determine whether the smart phone remains within the detection range of the respective stationary motion sensor.

13. The method according to claim 10 further comprising the step of calibrating the positional information provided by the inertial measurement unit of the smart phone on the basis of the detection range limits of the motion sensors of the stationary sensor units, wherein the calibration is accomplished by comparing entrances of the detection range to the respective motion sensor to the positional information determined by the inertial measurement unit on the smart phone at a point in time.

14. The method according to claim 10 further comprising the step of providing at least one mounted device that defines a reference position for the inertial measurement unit to calculate the positional information of the smart phone, wherein the reference point provides the spatially defined known, starting point for the inertial measurement unit and the mounted device communicates the smart phone wirelessly.

* * * * *